United States Patent Office 2,874,184
Patented Feb. 17, 1959

2,874,184

PREPARATION OF 1-HALOPHOSPHONIC ACIDS

John L. Van Winkle, San Lorenzo, and Rupert C. Morris, Berkeley, Calif., assignors to Shell Development Company, New York, N. Y., a corporation of Delaware No Drawing. Application May 13, 1957
Serial No. 658,503

6 Claims. (Cl. 260—500)

This invention relates to a process for preparing 1-halophosphonic acids. More particularly, this invention relates to an improved process for preparing 1-halophosphonic acids from carbonyl compounds and halides of trivalent phosphorus.

The generic term "1-halophosphonic acid" is employed herein in accordance with the usage recommended by G. M. Kosolapoff in "Organo-phosphorus Compounds" (Wiley and Sons, 1950), to include both the primary phosphonic acids of the formula $RP(O)(OH)_2$, and the secondary phosphonic acids of the formula $(R)(R')P(O)(OH)$, wherein the group R represents a 1-halo group (that is, an organic group attached directly to the phosphorus atom by a carbon-to-phosphorus bond in which the carbon atom attached directly to the phosphorus atom is bonded to a halogen atom), and the group R' represents an organic group attached directly to the phosphorus atom by a carbon-to-phosphorus bond.

It has recently been discovered that certain of the amine salts of 1-haloalkylphosphonic acids impart outstanding extreme pressure and load carrying properties to lubricant compositions in which they are incorporated. Further, these amine salts are quite soluble in oil and neither corrode nor stain metals with which they come into contact. These amine salts of 1-haloalkylphosphonic acids thus are promising extreme pressure agents for lubricating compositions.

The amine salts of 1-haloalkylphosphonic acids normally are prepared by simply mixing the acid and the amine. There is, therefore, a substantial interest in simple and efficient methods for producing 1-halophosphonic acids cheaply. The simplest and least costly method for preparing these acids disclosed in the art is that of Kabachnik and Shepeleva, reported by them in Izvest. Akad. Nauk S. S. S. R., Otdel. Khim, Nauk 1950, 39–46, and 1951, 185–91, and in Doklady Akad. Nauk S. S. S. R. 75, 219–22 (1950). According to these authors, 1-halophosphonic acids are prepared by hydrolysis (by water) of 1-halophosphonic halides which are formed by reacting a carbonyl compound with a halide of trivalent phosphorus, in a mole ratio of about 1:1.5, for 3–6 hours at a temperature of from about 160° C. to about 250° C.

It has been found that a marked increase in the yields of 1-halophosphonic halides obtainable from the reaction of carbonyl compounds with halides of trivalent phosphorus results from conducting the reaction in the presence of added hydrogen halide of the class consisting of hydrogen bromide and hydrogen chloride. That discovery forms the subject matter of copending application Serial No. 658,544, filed May 13, 1957.

We have now discovered that substantially higher yields of the desired 1-halophosphonic acids are obtained from the product of the reaction of the carbonyl compound and the halide of trivalent phosphorus by removing from the crude reaction mixture the unreacted halide of trivalent phosphorus and the hydrogen halide (if it be present) and hydrolyzing the resulting mixture with water. By proceeding in this manner, yields of 1-halophosphonic acids of the order of 90%, based on the carbonyl compound consumed, are easily obtained, whereas if the 1-halophosphonic halide is first recovered and purified, and the purified halide hydrolyzed with water, yields of 1-halophosphonic acid of the order of 75–80%, based on the carbonyl compound consumed, are obtained when employing our catalytic process, while even lower yields of the 1-halophosphonic acid (of the order of 65% or less, based on the carbonyl compound consumed) are obtained when employing the non-catalytic process of the art. Further, the product obtained according to our discovery is of very high purity —of the order of 90–95% of the acid—requiring little or no further purification for use in preparing the desired amine salts.

Our discovery thus provides basis for a new and improved method for preparing 1-halophosphonic acids from carbonyl compounds and halides of trivalent phosphorus. Briefly, this new process comprises reacting a carbonyl compound and a molar excess of a di- or trihalide of trivalent phosphorus (preferably in the presence of added hydrogen halide that is, hydrogen bromide or hydrogen chloride), removing unreacted halide of trivalent phosphorus and hydrogen halide if present, and hydrolyzing the resulting reaction mixture with water.

The reaction proceeds according to the following equation:

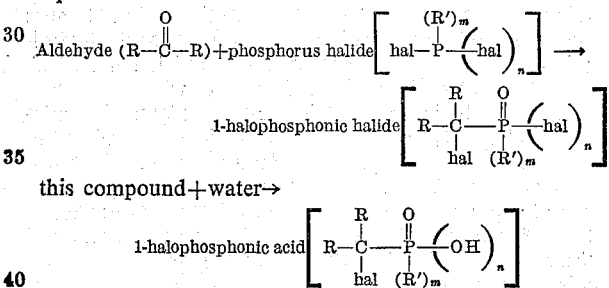

this compound + water →

$$\text{1-halophosphonic acid} \left[ \begin{matrix} R & O \\ | & \| \\ R-C- & -P-(OH) \\ | & | \\ hal & (R')_m \end{matrix} \right]_n$$

wherein hal is bromine or chlorine, each of R and R' is hydrogen or an unsubstituted hydrocarbon group, preferably an alkyl group, free from olefinic and acetylenic unsaturation, and $n$ is an integer of from 1 to 2, with the proviso that $m+n=2$.

The non-catalytic process for conducting the reaction of carbonyl compounds and halides of trivalent phosphorus is set out in some detail in the hereinbefore cited article by Kabachnik and Shepeleva, and in the article by Crofts and Kosolapoff in J. Am. Chem. Soc. 75, 5738–40 (1953).

The catalytic process which has been discovered is described in detail in copending application Serial No. 658,544.

Briefly, the non-catalytic process comprises reacting a carbonyl compound and at least an equivalent amount, on a molar basis, of a halide of trivalent phosphorus at a temperature of from about 160° C. to about 250° C. for a period of from about 3 to 5 hours. Preferably at least 1.5 moles of the halide are used per mole of the carbonyl compound.

Briefly, the catalytic process comprises conducting the reaction of the carbonyl compound and the halide of trivalent phosphorus under about these same conditions in the presence of added hydrogen halide, the amount of said hydrogen halide being at least 0.01 mole per mole of the carbonyl compound. For details of this process, reference is hereby made to the disclosures of copending application Serial No. 658,544. The pertinent disclosures of said copending application—that is, those portions of that application which deal with mono-organo-phosphorus dihalides and di-organo-phosphorus monohalides as the halide of trivalent phosphorus reactant—are hereby incorporated into and made a part of this description of our improved process for preparing 1-halophosphonic acids. The crude reaction mixtures resulting from reaction of the carbonyl compound and the halide of trivalent phosphorus according to the catalytic process are particularly preferred as the starting materials for preparing 1-halophosphonic acids according to our new process described herein.

The prior art shows reaction of the carbonyl compound with the halide of trivalent phosphorus, followed by separation of the 1-halophosphonic halide from the reaction mixture, and hydrolysis by water of the separated, purified 1-halophosphonic acid to the corresponding 1-halophosphonic acid. According to our discovery, markedly higher yields of the 1-halophosphonic acid are obtained by stripping only the unreacted halide of trivalent phosphorus used as reactant and the hydrogen halide, if such has been used, from the crude reaction mixture, and hydrolyzing this stripped reaction mixture with water.

Stripping of the unreacted halide of trivalent phosphorus and the hydrogen halide is normally most conveniently and efficiently effected by distillation. In some cases, however, removal of the unreacted halide and the hydrogen halide may be more conveniently, or effectively, obtained by extraction of the reaction mixture with a suitable solvent.

Hydrolysis of the stripped reaction mixture is effected by introducing the stripped reaction mixture into water, with thorough agitation of the resulting mixture throughout the introduction of the reaction mixture to the water. Preferably, the reaction mixture is added to the water rather slowly, so that the heat of reaction does not cause spattering, or undue rise in the temperature of the hydrolysis mixture. The amount of water used is not critical, provided that sufficient is used to react with the 1-halophosphonic halide product in the stripped reaction mixture. Normally at least about five times the minimum amount of water theoretically required should be used. In most cases, from about 10 to about 30 times the theoretical amount of water is most effectively used, since this bulk of water permits better control of the temperature of the mixture during introduction of the stripped reaction mixture into the water.

The mixing of the stripped reaction mixture and the water, and the hydrolysis, is effected at any temperature from room temperature up to about the boiling point of water—that is, from about 20° C. to about 100° C. Preferably, the addition of the stripped reaction mixture to the water is conducted at a temperature within the range of from about 50° C. to about 80° C., and following addition of all of the stripped reaction mixture to the water, the mixture then is heated at a temperature of from about 80° C. to about 100° C. to insure completion of the reaction.

The time required for addition of the stripped reaction mixture to the water will, of course, depend upon the relative amounts of the reaction mixture and water involved, respectively, and the tempearture to be maintained. In general, where from about 10 to about 30 times the theoretical amount of water is used, relative to the amount of stripped reaction mixture to be hydrolyzed, addition of the reaction mixture to the water may be effected in as short a time as 30 minutes, or as much as 4–5 hours may be required. Usually, about 2 hours will be found most convenient, and effective to insure complete reaction. The heating period following addition of all of the stripped reaction mixture to the water may be as short as 10–15 minutes, or up to 4–5 hours may be desirable. Here again a period of about 2 hours normally is both convenient and effective.

Following completion of the hydrolysis, the hydrolysis mixture is then dehydrated. This normally is most conveniently effected by heating the mixture on a steam bath, employing moderate vacuum.

The product acid is recovered by conventional techniques—distillation, extraction, or the like. In many cases, particularly where the reactants were a phosphorus trihalide and a lower aliphatic aldehyde, the dried hydrolysis mixture will be found to be the product acid in high purity, requiring little or no further purification, especially where it is to be used in preparing the desired amine salts.

The foregoing constitutes a general description of the process which embodies our discovery. The following example illustrates a particular embodiment of that process. This example is included only for the purpose of illustrating our discovery, and is not intended to limit the process which embodies that discovery in any manner not recited in the claims. In the example, the term "parts," means parts by weight, unless specifically stated otherwise.

Example I 206 parts of phosphorus trichloride, 28.5 parts of paraformaldehyde and 5 parts of anhydrous hydrogen chloride were charged seriatim to a pressure vessel. The molar ratios of these compounds thus was 1.5:0.95:0.13. The vessel then was placed in a shaker and with continuous shaking was heated at 250° C. for 3 hours and 10 minutes. At the end of this time, the vessel was immediately cooled and the contents were distilled to remove the hydrogen chloride and unreacted phosphorus trichloride. 136 grams of product were obtained. This product then was added, with continuous thorough stirring, over a period of 2 hours to 225 parts of water, the temperature of the mixture being maintained within the range of 50–70° C. The mixture then was, with continuous stirring, heated on a steam bath (mixture temperature about 96° C.) for an additional 1 hour and 20 minutes, and then was dehydrated by heating on the steam bath (96° C.) for 2 hours under a pressure of about 150 millimeters mercury absolute. 110 grams of product were obtained. The product was found to be chloromethylphosphonic acid of high purity: melting point, 88° C. (pure chloromethylphosphonic acid has a melting point of 90–90.5° C.); analysis, percent w. carbon, 8.6 (theoretical [1], 9.2); percent w. hydrogen, 3.4 (theoretical [1], 3.1); percent w. phosphorus, 23.8 (theoretical [1], 23.8); percent w. chlorine, 26.0 (theoretical [1], 27.2); equivalent weight, 130.0 (theoretical [1], 130.5).

The yield of acid, based upon the amount of formaldehyde consumed, thus was 88.8%.

To demonstrate the advantage of this method for preparing 1-halophosphonic acids over the prior art method, two other experiments were performed. In the first of these experiments, paraformaldehyde and phosphorus trichloride were reacted in the manner reported in Example I. The chloromethylphosphonic dichloride product was separated from the crude mixture obtained on the reaction of the paraformaldehyde and the phosphorus trichloride, and the separated and purified dichloride was hydrolyzed with water. The yield of acid, based on the amount of formaldehyde consumed, was 73.8%. In the second of the two experiments, paraformaldehyde and phosphorus trichloride were reacted under substantially the same conditions reported in Example I, no hydrogen chloride being added. The purified chloromethylphosphonic dichloride recovered from the crude paraformaldehyde-phosphorus trichloride reaction mixture was hydrolyzed with water. The yield of acid was but 46.3%, based upon the amount of formaldehyde consumed.

Proceeding according to our discovery thus resulted in a 17% increase over the yield of acid obtained by employing the catalytic method for reacting the carbonyl compound and the halide of trivalent phosphorus, and resulted in a 92% increase over the yield of the prior art non-catalytic process for reacting the carbonyl compound and the halide of trivalent phosphorus.

---
[1] (For $CH_4PO_3Cl$.)

We claim as our invention:
1. In a process for preparing a compound of the formula:

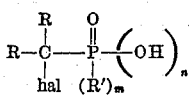

by hydrolysis of a compound of the formula:

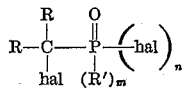

prepared by reacting a carbonyl compound of the formula:

under substantially anhydrous conditions and in the substantial absence of molecular oxygen, with at least an equivalent number of moles of a halide of trivalent phosphorus having the formula:

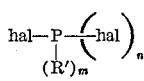

wherein each of R and R' represents a member of the group consisting of hydrogen and unsubstituted hydrocarbon groups free from olefinic and acetylenic unsaturation, hal represents a member of the group consisting of chlorine and bromine, and $n$ is an integer of from 1 to 2, with the proviso that $m+n=2$, the improvement which comprises removing unreacted halide of phosphorus from the crude reaction mixture obtained on the reaction of the carbonyl compound and the halide of phosphorus, and hydrolyzing the resulting mixture with water.

2. In a process for preparing a compound of the formula:

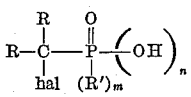

by hydrolysis of a compound of the formula:

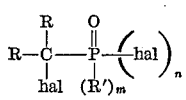

prepared by reacting a carbonyl compound of the formula:

under substantially anhydrous conditions, in the substantial absence of molecular oxygen and in the presence of at least 0.01 mole per mole of said carbonyl compound of an added hydrogen halide of the class consisting of hydrogen bromide and hydrogen chloride, with at least an equivalent number of moles of a halide of trivalent phosphorus having the formula:

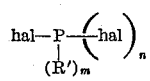

wherein each of R and R' represents a member of the group consisting of hydrogen and unsubstituted hydrocarbon groups free from olefinic and acetylenic unsaturation, hal represents a member of the group consisting of chlorine and bromine, and $n$ is an integer of from 1 to 2, with the proviso that $m+n=2$, the improvement which comprises removing unreacted halide of phosphorus and hydrogen halide from the crude reaction mixture obtained on the reaction of the carbonyl compound and the halide of phosphorus, and hydrolyzing the resulting mixture with water.

3. In a process for preparing a compound of the formula:

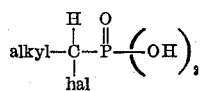

from a compound of the formula:

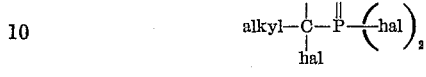

prepared by reaction of an aldehyde of the formula:

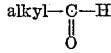

and a phosphorus trihalide of the formula:

wherein hal is a member of the class consisting of bromine and chlorine, under substantially anhydrous conditions, in the substantial absence of molecular oxygen and in the presence of at least 0.01 mole per mole of said aldehyde of an added hydrogen halide of the class consisting of hydrogen bromide and hydrogen chloride, the improvement which comprises removing unreacted phosphorus trihalide and hydrogen halide from the crude reaction mixture obtained on the reaction of the said aldehyde and said phosphorus trihalide, and hydrolyzing the resulting mixture with water.

4. In a process for preparing a compound of the formula:

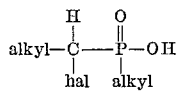

from a compound of the formula:

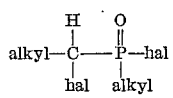

prepared by reaction of an aldehyde of the formula:

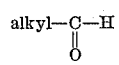

and a phosphorus trihalide of the formula:

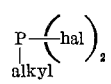

wherein hal is a member of the class consisting of bromine and chlorine, under substantially anhydrous conditions, in the substantial absence of molecular oxygen and in the presence of at least 0.01 mole per mole of said aldehyde of an added hydrogen halide of the class consisting of hydrogen bromide and hydrogen chloride, the improvement which comprises removing unreacted phosphorus trihalide and hydrogen halide from the crude reaction mixture obtained on the reaction of the said aldehyde and said phosphorus trihalide, and hydrolyzing the resulting mixture with water.

5. In a process for preparing chloromethylphosphonic acid formed by the hydrolysis of chloromethylphosphonic dichloride by reacting paraformaldehyde with phosphorus trichloride, under substantially anhydrous conditions, in the substantial absence of molecular oxygen, and in the presence of at least 0.01 mole per mole of said paraformaldehyde of added hydrogen chloride, the improvement which comprises removing unreacted phosphorus trichloride and hydrogen chloride from the crude paraformaldehyde-phosphorus trichloride reaction mixture, and hydrolyzing the resulting mixture with water.

6. In a process for preparing chloromethylphosphonic acid formed by the hydrolysis of chloromethylphosphonic dichloride by reacting paraformaldehyde with phosphorus trichloride, under substantially anhydrous conditions, and in the substantial absence of molecular oxygen, the improvement which comprises conducting the said reaction of paraformaldehyde and phosphorus trichloride in the presence of at least 0.01 mole per mole of said paraformaldehyde of hydrogen chloride, removing hydrogen chloride and unreacted phosphorus trichloride from the resulting crude reaction mixture, and hydrolyzing the resulting mixture with water.

References Cited in the file of this patent

Nabachnik et al.: Izvest. Akad. Nauk S. S. S. R., Otdel Khim, Nauk. 1951, 185–91.

Chemical Abstracts, vol. 45, col. 10191 (1951).